(12) United States Patent
Sato (10) Patent No.: US 6,342,993 B1
(45) Date of Patent: Jan. 29, 2002

(54) THIN FILM MAGNETIC HEAD AND METHOD OF MANUFACTURING THE SAME

(75) Inventor: Junichi Sato, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/417,020

(22) Filed: Oct. 12, 1999

(30) Foreign Application Priority Data

Oct. 13, 1998 (JP) .......................... 10-291151
Sep. 20, 1999 (JP) .......................... 11-264867

(51) Int. Cl.⁷ ............................... G11B 5/39
(52) U.S. Cl. ...................... 360/319; 360/320
(58) Field of Search ........................ 360/317, 319, 360/327, 327.22, 126, 320

(56) References Cited

U.S. PATENT DOCUMENTS 5,168,409 A * 12/1992 Koyama et al. ............ 360/319
5,491,600 A    2/1996 Chen et al.
5,898,548 A * 4/1999 Dill et al. .................... 360/319
6,118,621 A * 9/2000 Ohsawa et al. ............. 360/327
6,198,609 B1 * 3/2001 Barr et al. ................... 360/319

FOREIGN PATENT DOCUMENTS

| JP | A-3-30107 | 2/1991 |
| JP | A-6-180825 | 6/1994 |
| JP | A-7-302414 | 11/1995 |

* cited by examiner

*Primary Examiner*—David L. Ometz
(74) *Attorney, Agent, or Firm*—Oliff & Berridge, PLC (57) ABSTRACT

A concave portion corresponding to the reading track width is formed in the surface of a bottom shield layer so that a step is formed in an insulating layer (bottom shield gap film) between the region where an AMR element is formed and the region where a lead electrode layer is formed. Thereby, the lead electrode layer can be made thicker. At the same time, a step on a top shield layer side can be suppressed even if the lead electrode layer is formed thick. Also, height of a photoresist pattern used for lift-off can be decreased so that the reading track width can be made narrow.

3 Claims, 10 Drawing Sheets

THIN FILM MAGNETIC HEAD AND METHOD OF MANUFACTURING THE SAME

BACKGROUND OF THE INVENTION

1. Field of the Invention

The invention relates to a thin film magnetic head having at least a magnetoresistive element for reading out and a method of manufacturing the same.

2. Description of the Related Art

In recent years, performance improvement in thin film magnetic heads has been sought in accordance with an increase in surface recording density of a hard disk drive. As a thin film magnetic head, a composite thin film magnetic head has been widely used. A composite thin film magnetic head has a layered structure which includes a recording head with an inductive-type magnetic transducer for writing and a reproducing head with a magnetoresistive element (also referred as MR element in the followings) for reading-out. There are a few types of MR elements: one is an AMR element that utilizes the anisotropic magnetoresistance effect (referred as AMR effect in the followings) and the other is a GMR element that utilizes the giant magnetoresistance effect (referred as GMR effect in the followings). A reproducing head using an AMR element is called an AMR head or simply an MR head. A reproducing head using the GMR element is called a GMR head. The AMR head is used as a reproducing head whose surface recording density is more than 1 gigabit per square inch. The GMR head is used as a reproducing head whose surface recording density is more than 3 gigabit per square inch.

The AMR head includes an AMR film having the AMR effect. The GMR head has the similar configuration to the AMR head except that the AMR film is replaced with a GMR film having the GMR effect. However, compared to the AMR film, the GMR film exhibits a greater change in resistance under a specific external magnetic field. Accordingly, the reproducing output of the GMR head becomes about three to five times greater than that of the AMR head.

In general, an AMR element is a film made of a magnetic substance which exhibits the MR effect and has a structure of two to four layers. In contrast, most of the GMR films have a multi-layered structure consisting of a plurality of films. There are several types of mechanisms which produce the GMR effect. The layer structure of the GMR film depends on those mechanisms. GMR films include a superlattice GMR film, a granular film, a spin valve film and so on. The spin valve film is most sufficient since the film has a relatively simple structure, exhibits a great change in resistance in a low magnetic field, and is suitable for mass production. The performance of the reproducing head can be easily improved by, for example, replacing an AMR film with an MR film with high magnetoresistive sensitivity such as a GMR film.

Now, an example of a method of manufacturing a composite thin film magnetic head (AMR head) will be described with reference to FIG. 12 to FIGS. 19A, 19B as an example of a method of manufacturing a thin film magnetic head of the related art. FIG. 12 to FIG. 16 show an enlarged configuration of the air bearing surface (ABS) of the AMR head, respectively. FIG. 17A to FIG. 19A show the cross sectional configuration of the AMR head vertical to the air bearing surface while FIG.17B to FIG. 19B show the cross sectional configuration of the pole portion parallel to the air bearing surface, respectively.

Figure 12:
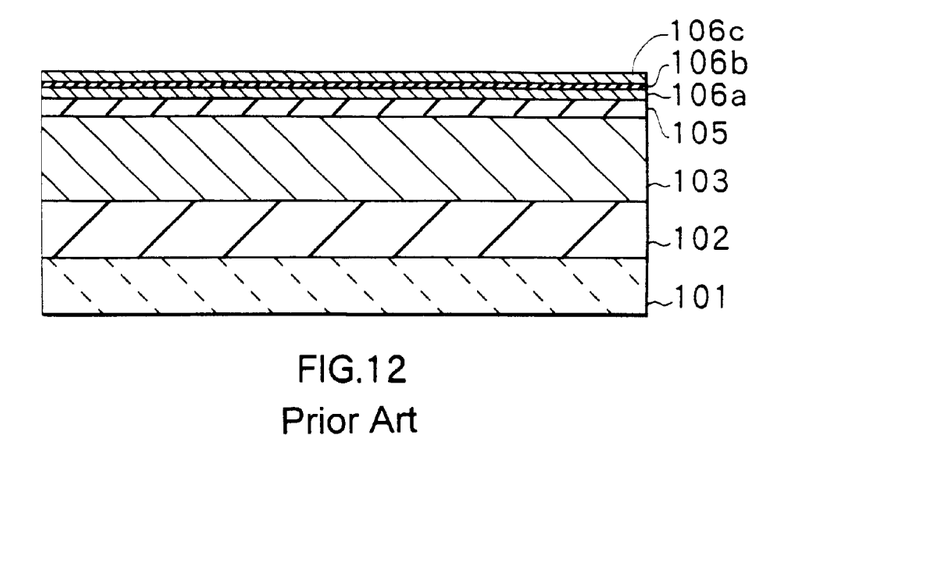
FIG. 12 is a cross section for describing a step in a method of manufacturing a thin film magnetic head of the invention.

First, as shown in FIG. 12, an insulating layer 102 made of, for example, alumina ($Al_2O_3$) is deposited to a thickness of about 5 to 10 $\mu$m on a substrate 101 made of, for example, attic ($Al_2O_3$—TiC). Next, a bottom shield layer 103 for a reproducing head made of a magnetic material is formed in a thickness of about 2 to 3 $\mu$m on the insulating layer 102. Next, a bottom shield gap film 105 as an insulating layer is formed through depositing, for example, alumina or aluminum nitride in thickness of 50 to 100 nm on the bottom shield layer 103 by sputtering. Next, a SAL (Soft Adjacent Layer) film 106a for applying bias magnetic field, a tantalum (Ta) film 106b as a magnetic isolation film and an AMR film 106c are formed on the bottom shield gap film 105 in this order.

Figure 13:
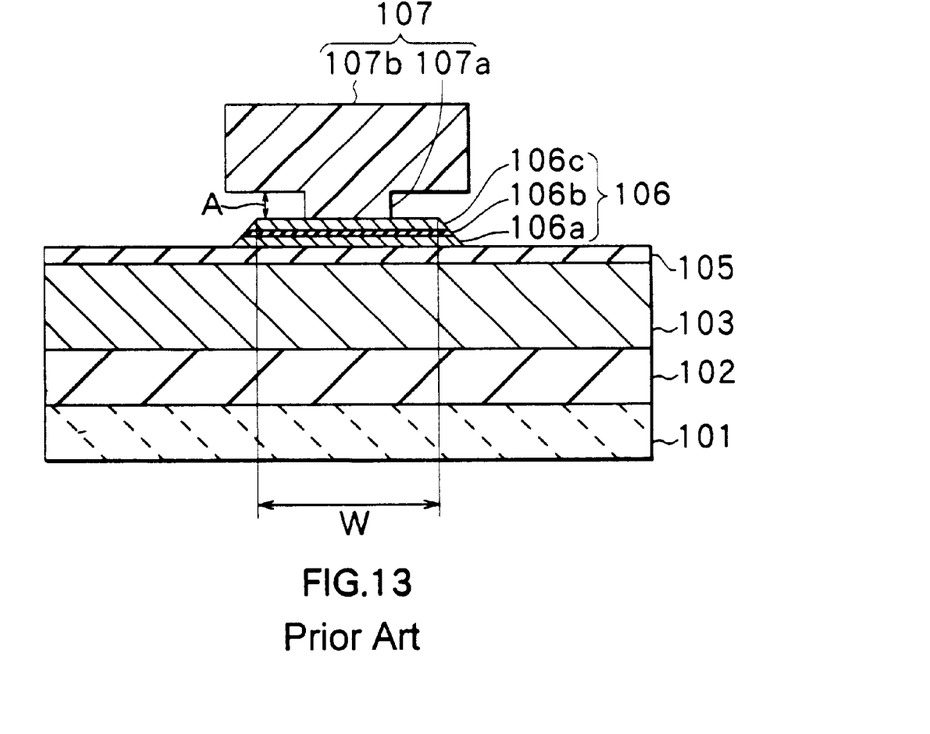
FIG. 13 is a cross section for describing a step following the step shown in FIG. 12.

Next, as shown in FIG. 13, a photoresist pattern 107 having a longitudinal bar 107a and a lateral bar 107b is selectively formed on the AMR film 106c. At this time, a photoresist pattern 107 with, for example, a T-shaped cross section is formed so that lift-off can be easily performed. Next, an AMR element 106 is formed through etching the AMR film 106c, the tantalum film 106b and the SAL film 106a to a taper shape by, for example, ion milling using the photoresist pattern 107 as a mask.

Figure 14:
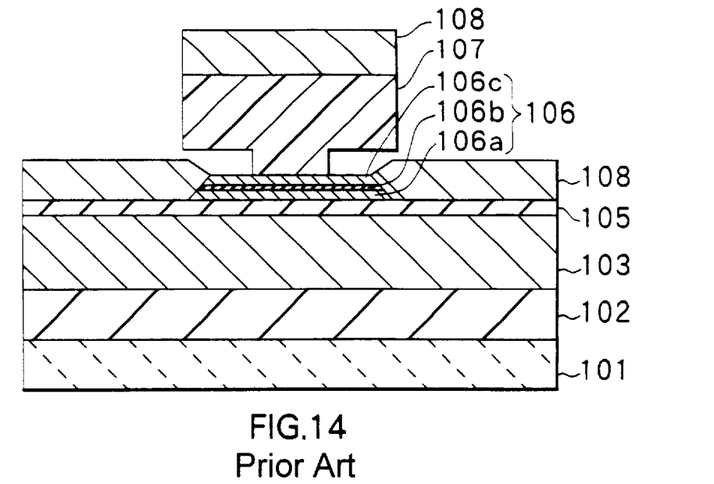
FIG. 14 is a cross section for describing a step following the step shown in FIG. 13.

Next, as shown in FIG. 14, a pair of lead electrode layers 108 which are electrically connected to the AMR film 106c are formed on the shield gap film 105 by, for example, sputtering using the photoresist pattern 107 as a mask. The lead electrode layers 108 have a configuration in which a domain control film for suppressing noise made of, for example, cobalt-platinum alloy (CoPt) and a lead film for detecting signals made of, for example, titanium-tungsten (TiW) or tantalum are stacked, and are formed to cover the adjacent area of the end (side-end face and both end of the surface) of the AMR film 106c.

Figure 15:
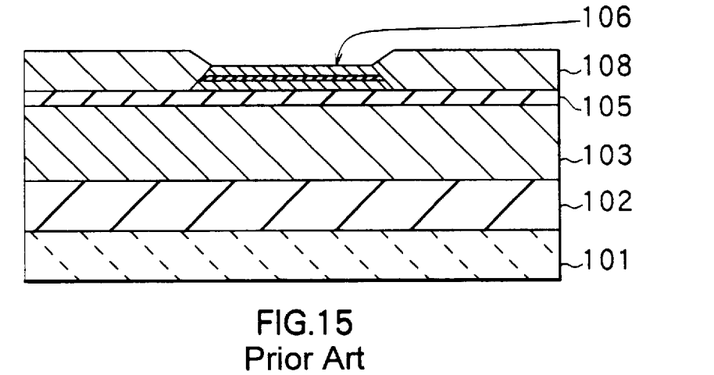
FIG. 15 is a cross section for describing a step following the step shown in FIG. 14.

Next, as shown in FIG. 15, the photoresist pattern 107 is lifted off. Then, although not shown in FIG. 15, another pair of lead electrode layers 111 (See. FIG. 17B) which are electrically connected to the lead electrode layers 108 are formed in a thickness of about 100 to 300 nm in a predetermined pattern. The lead electrode layers 111 are not exposed to the air bearing surface (ABS). Therefore, they are formed of a substance with low resistivity such as copper (Cu).

Figure 16:
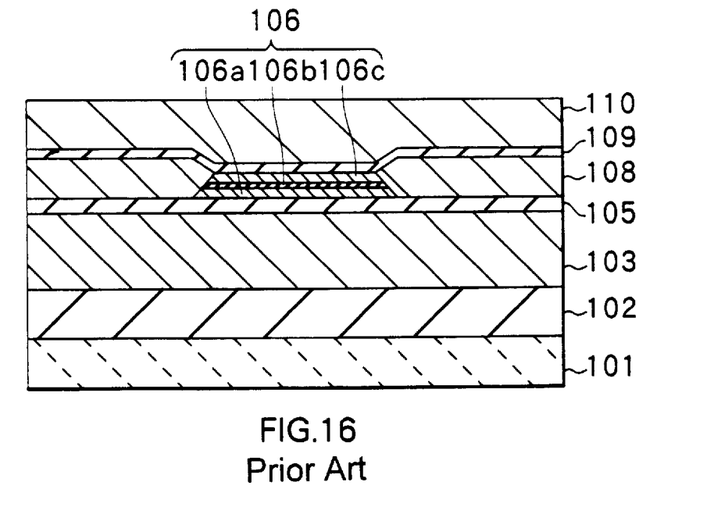
FIG. 16 is a cross section for describing a step following the step shown in FIG. 15.

Next, as shown in FIG. 16, a top shield gap film 109 as an insulating layer is formed in a thickness of 50 to 150 nm on the lead electrode layers 108 and the AMR film 106c so as to bury the AMR element 106 in the shield gap films 105 and 109. Next, a top shield layer-cum-bottom pole (referred as a top shield layer in the followings) 110 made of a magnetic material, which is used for both a reproducing head and a recording head, is formed in a thickness of about 3 $\mu$m on the top shield gap film 109.

Figure 17A:
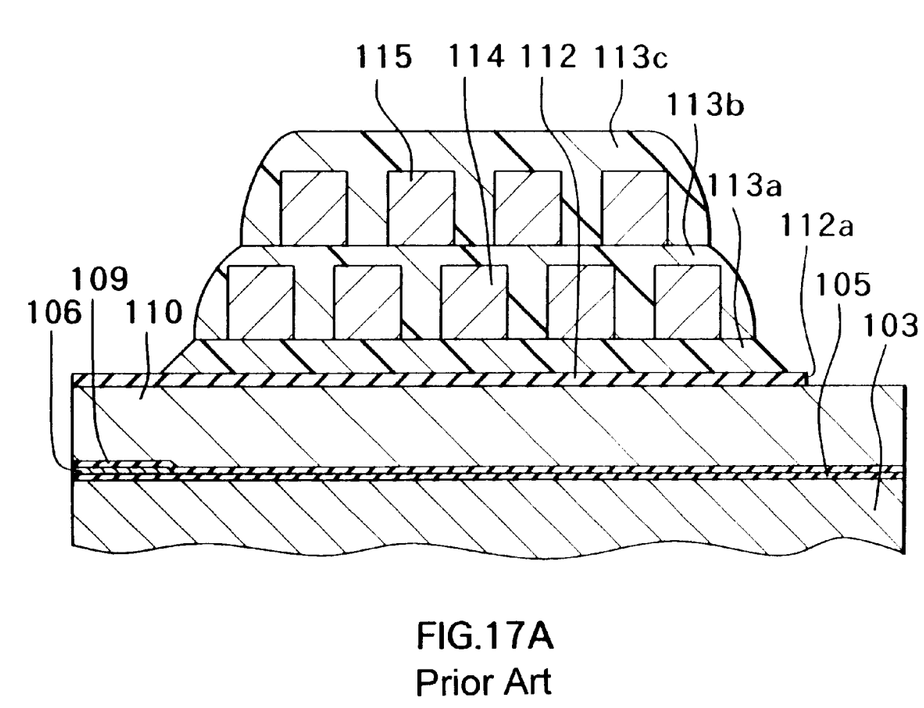
FIGS. 17A and 17B are cross sections for describing a step following the step shown in FIG. 16.
Figure 17B:
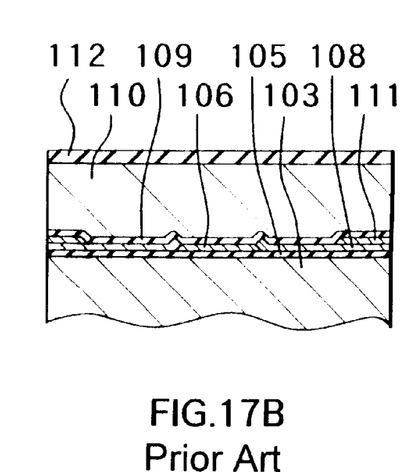

Next, as shown in FIGS. 17A and 17B, a write gap layer 112 made of an insulating film such as an alumina film is formed in a thickness of 0.2 to 0.3 $\mu$m on the top shield layer 110. Then, an opening (contact hole) 112a for a magnetic path is formed by partially etching the write gap layer 112 in a backward position (right-side in FIGS. 17A and 17B) of a region where thin film coils 114 and 115 are to be formed later. Next, a photoresist layer 113a for determining the throat height is formed in a thickness of about 1.0 to 2.0 $\mu$m in a predetermined pattern on the write gap layer 112. Then, a thin film coil 114 for an inductive-type recording head is formed in a thickness of 3 $\mu$m on the photoresist layer 113a. Next, a photoresist layer 113b is formed in a predetermined pattern on the photoresist layer 113a and the thin film coil 114. Next, a thin film coil 115 is formed in a thickness of 3 $\mu$m on the photoresist layer 113b. Then, a photoresist layer 113c is formed in a predetermined pattern on the photoresist layer 113b and the thin film coil 115.

Figure 18A:
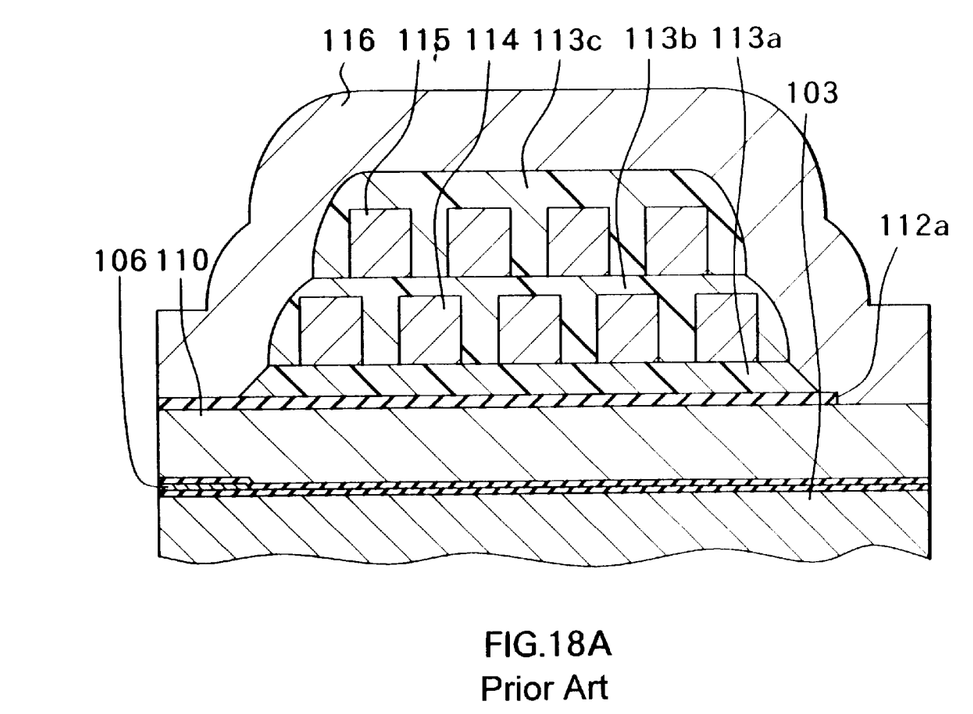
FIGS. 18A and 18B are cross sections for describing a step following the step shown in FIGS. 17A and 17B.
Figure 18B:
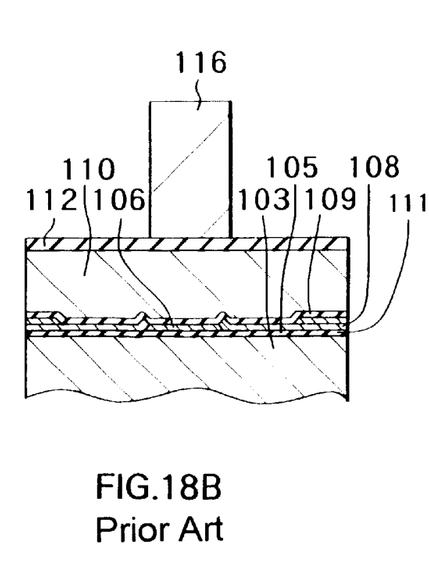

Next, as shown in FIGS. 18A and 18B, a top pole 116 made of magnetic materials for a recording head such as permalloy (NiFe) or nitride ferrous (FeN) is formed in a thickness of about 30 µm on the write gap layer 112 and the photoresist layers 113a to 113c. The top pole 116 is in contact with and magnetically coupled to the top shield layer 110 through the contact hole 112a in the backward position of the thin film coils 114 and 115.

Figure 19A:
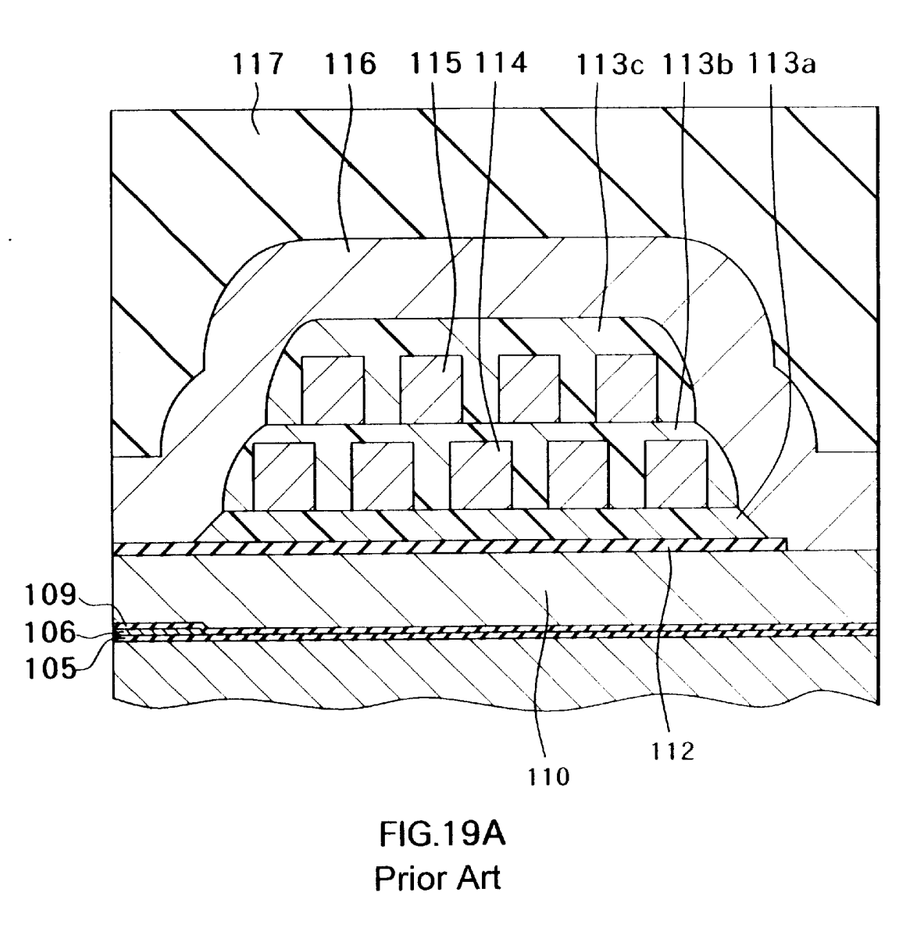
FIGS. 19A and 19B are cross sections for describing a step following the step shown in FIGS. 18A and 18B.
Figure 19B:
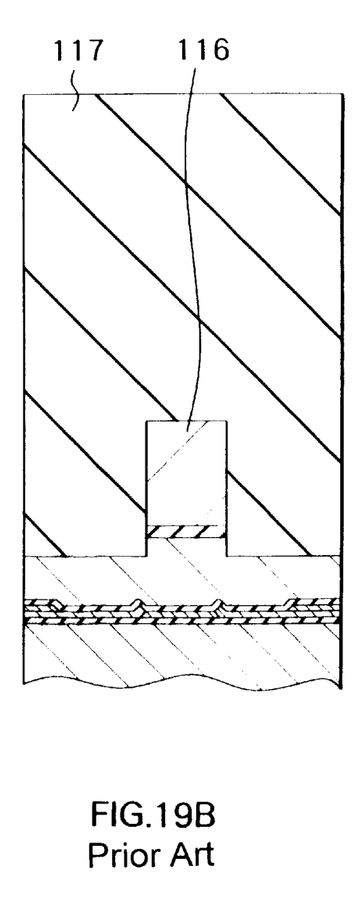

Next, as shown in FIGS. 19A and 19B, the write gap layer 112 and the top shield layer 110 are etched by ion milling using the top pole 116 as a mask. Next, an overcoat layer 117 made of, for example, alumina is formed in a thickness of 20 to 50 µm on the top pole 116. Then, after completing the remaining steps for the wafer (description is omitted), the air bearing surface of the recording head and the reproducing head is formed by performing machine processing on the slider. Thereby, a thin film magnetic head is completed. As shown in FIGS. 19A and 19B, the configuration in which each sidewall of part of the top pole 116, the write gap layer 112 and the top shield layer 110 is vertically formed in a self-aligned manner is called a trim structure. With the trim structure, widening of the effective track width due to the spread of magnetic flux generated at the time of writing of the narrow track can be suppressed.

In a magnetic head manufactured as described, it is necessary to narrow the reading track width, for example, represented by W in FIG. 13, in order to improve the track density. In order to improve the output performance of a reproducing head, it is desired that the wiring resistance of the lead electrode layers 108 connected to the magnetoresistive element such as the AMR element 106 is low. However, the lead electrode layers 108 are exposed to the air bearing surface so that a material with low resistivity and less anticorrosive such as copper (Cu) can not be used. Therefore, in the related art, a method as follows is proposed: using tantalum (Ta), tungsten (W) or the like which has relatively low resistivity and is highly anticorrosive for the lead electrode layers 108; and thickening the film thickness of the lead electrode layer 108 so as to lower the wiring resistance.

In a manufacturing process of a magnetic head of the related art, the reading track width of a reproducing track is, for example, as shown in FIG. 13 to FIG. 15, determined by lift-off of the photoresist pattern 107. Therefore, it is necessary to increase the height A of the longitudinal bar 107a of the photoresist pattern 107 in order to thicken the lead electrode layers 108 connected to the AMR element 106. However, if the height A of the photoresist pattern 107 is increased, narrowing the width (length of the lateral bar 107b) and the reading track width W becomes difficult. As described, in the process of the related art, it is difficult to narrow the reading track width W of the AMR element 106 while thickening the film thickness of the lead electrode layers 108 to lower the wiring resistance of the electrode.

Also, if the thickness of the lead electrode layer 108 is simply thickened, the wiring resistance decreases. However, changes in the shape of the top shield layer become large by doing so and its characteristic is deteriorated.

For example, Japanese Patent Application laid-open Hei 6-180825 discloses a technique of decreasing the wiring resistance by increasing the cross sectional area through adding another conductive layer so as to cover a part of the conductive layer (lead electrode layer) connected to a magnetoresistive element. Also, Japanese Paten Application laid-open Hei 7-302414 discloses a technique in which the configuration of a lead structure (lead electrode layer) is made to include high-conductive metal and heat proof metal. Japanese Patent Application laid-open Hei 3-30107 discloses a technique in which the film thickness of a lead electrode layer becomes thicker as it becomes distant from the reading track of a magnetoresistive element. However, none of those techniques mentions a method of solving problems raised when thickening the film of the electrode layer. Therefore, there still exists a problem that it becomes harder to narrow the reading track width as the lead electrode layer is formed thicker.

SUMMARY OF THE INVENTION

The invention has been designed to overcome the foregoing problems. The object is to provide a thin film magnetic head in which the wiring resistance of a lead electrode layer connected to a magnetoresistive element is decreased even if the reading track width becomes narrow so that the track density is improved, and a method of manufacturing the same.

A thin film magnetic head of the invention comprises: a magnetoresistive element; two shield layers placed to face each other sandwiching the magnetoresistive element in between to shield the magnetoresistive element; an insulating layer provided between the magnetoresistive element and each of the shield layers; and a lead electrode layer, which is electrically connected to the magnetoresistive element, provided on one side of a substrate; wherein: a convex portion corresponding to the reading track width of the magnetoresistive element is provided on one of the shield layers.

A method of manufacturing a thin film magnetic head of the invention: comprising a magnetoresistive element; two shield layers placed to face each other sandwiching the magnetoresistive element in between to shield the magnetoresistive element; an insulating layer provided between the magnetoresistive element and each of the shield layers; and a lead electrode layer, which is electrically connected to the magnetoresistive element, provided on one side of a substrate; includes the steps of: forming a bottom shield layer which is one of the two shield layers; forming a concave portion corresponding to the reading track width of the magnetoresistive element in the surface of the bottom shield layer; forming the insulating layer on the bottom shield layer where the concave portion is formed and forming the magnetoresistive element thereon; and forming the lead electrode layer so as to electrically connect to the magnetoresistive element on the insulating layer.

In a thin film magnetic head and a method of manufacturing the same, the convex portion corresponding to the reading track width of the magnetoresistive element is provided on one of the shield layer. As a result, the film thickness of a lead electrode layer which is electrically connected to a magnetoresistive element along one of the insulating layer can be thickened while decreasing the width of the photoresist pattern used at the time of forming the lead electrode layer. Thereby, the reading track width can be narrowed.

In a thin film magnetic head of the invention and a method of manufacturing the same, an insulating layer other than the insulating layer provided between the bottom shield layer and the magnetoresistive element may be formed on the surface of the bottom shield layer on the side where the convex portion is formed; and a step may be provided between the surface of the convex portion of the shield layer and the surface of the other insulating layer. Thereby, the insulating characteristic between the lead electrode layer and the bottom shield layer can be improved without thickening the insulating layer between the magnetoresistive element and the bottom shield layer.

In a thin film magnetic head of the invention and a method of manufacturing the same, the sidewall surface of the convex portion of the bottom shield layer may form a slope toward the surface of the bottom shield layer on the side where the convex portion is formed.

In a method of manufacturing a thin film magnetic head of the invention, the other insulating layer having a step between the surface of the convex portion may be formed by performing flattening process through polishing an insulating material until the surface of the convex portion is exposed after depositing the insulating material all over the surface of the bottom shield layer where the convex portion is formed.

In addition, in a method of manufacturing a thin film magnetic head of the invention, the convex portion may be formed using a mask in the step of forming the convex portion of the bottom shield layer; and then after depositing an insulating material on the bottom shield layer and the mask, the insulating material on the convex portion is removed by removing the mask in the step of forming the other insulating layer.

In a method of manufacturing a thin film magnetic head of the invention, the convex portion of the bottom shield layer can be formed by milling method using a photoresist pattern as a mask. In this case, it is desired that the photoresist pattern has a T-shaped cross section.

In a thin film magnetic head of the invention and a method manufacturing the same, the width of the convex portion of one of the shield layer (or the bottom shield layer) may be narrower or wider than the reading track width. However, it is preferable that the difference lies within the range of +1 and −1 $\mu$m of the reading track width.

Other and further objects, features and advantages of the invention will appear more fully from the following description.

DETAILED DESCRIPTION OF THE PREFERRED EMBODIMENTS

Preferred embodiment of the invention will be described in the followings with reference to the drawings.

First Embodiment

First, a method of manufacturing a composite thin film magnetic head with an AMR will be described with reference to FIG. 1 to FIG. 4 as a method of manufacturing a thin film magnetic head according to a first embodiment of the invention. A thin film magnetic head according to the invention will be described together in the followings since it is embodied in the manufacturing method of the embodiment.

Figure 1:
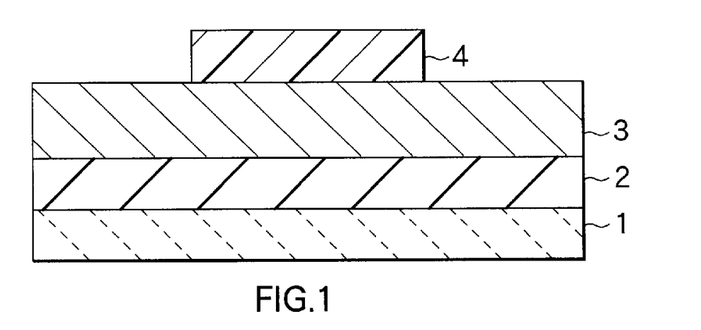
FIG. 1 is a cross section for describing a step in a method of manufacturing a thin film magnetic head according to a first embodiment of the invention.

In the embodiment, first, as shown in FIG. 1, an insulating layer 2 made of, for example, alumina ($Al_2O_3$) is deposited to a thickness of about 5 to 10 $\mu$m on a substrate 1 made of, for example, altic ($Al_2O_3$_TiC). Then, although not shown in figure, a seed layer as an electrode film, which is used at the time of forming a bottom shield layer by plating method, is formed on the insulating layer 2 by sputtering permalloy (NiFe). Then, a bottom shield layer 3 for a reproducing head is formed through selectively forming a magnetic material such as permalloy in a thickness of about 2 to 3 $\mu$m on the seed layer by plating method using a photoresist film as a mask. Then, a photoresist pattern 4 is formed on the bottom shield layer 3.

Figure 2:
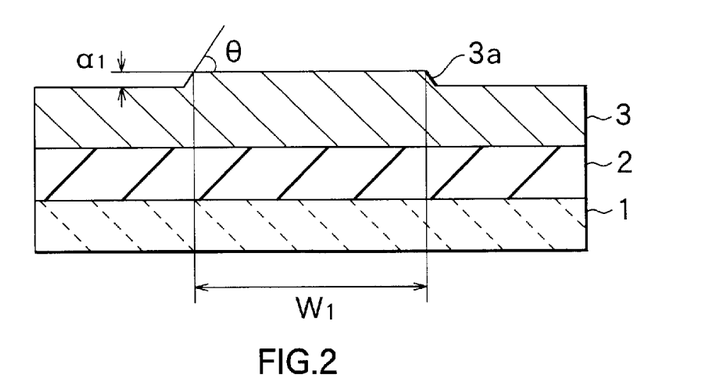
FIG. 2 is a cross section for describing a step following the step shown in FIG. 1.
Figure 3:
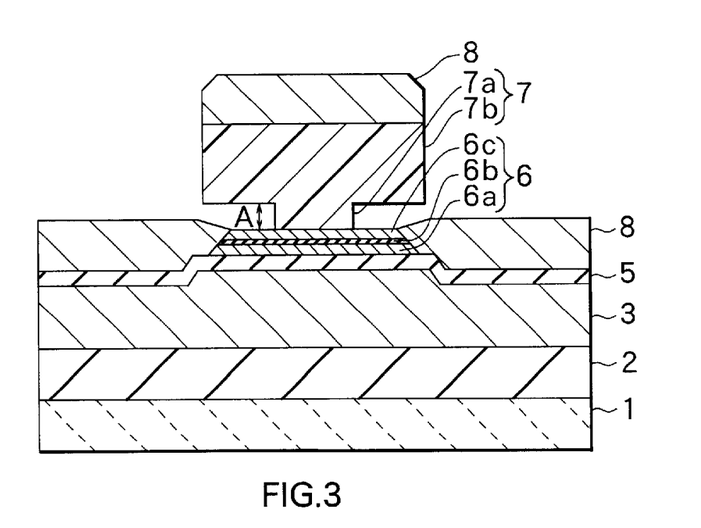
FIG. 3 is a cross section for describing a step following the step shown in FIG. 2.
Figure 4:
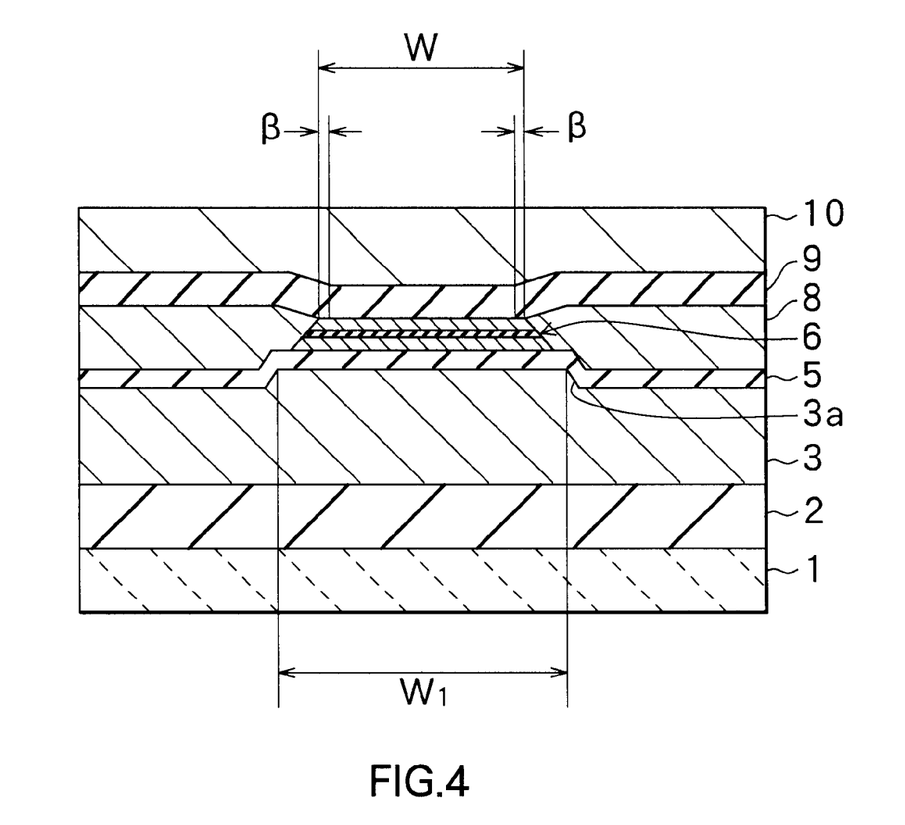
FIG. 4 is a cross section for describing a step following the step shown in FIG. 3.

Next, as shown in FIG. 2, a concave portion 3a having a width $W_1$=0.3 to 3.0 $\mu$m, which corresponds to the reading track width, and a height $\alpha_1$=0.1 to 0.5 $\mu$m is selectively formed on the bottom shield layer 3 by dry etching such as ion beam etching using the photoresist pattern 4 as a mask. The width $W_1$ of the convex portion 3a may be narrower or wider than the reading track width to be described later (See. FIG. 4.) However, it is preferable that the difference lies within the range of +1 and −1 of the reading track width. Also, at this time, it is preferable to form a taper with an angle θ=10 to 90° in the side face of the concave portion 3a. Thereby, the step of a bottom shield gap film 5 (See. FIG. 3) formed as described later on the convex portion 3a becomes smooth so that a film with excellent step coverage can be formed.

Next, as shown in FIG. 3, a bottom shield gap film 5 is formed through forming an insulating material such as aluminum nitride or alumina in a thickness of about 50 to 100 nm on the bottom shield layer 3 by sputtering. The bottom shield gap film 5 corresponds to a specific example of an "insulating layer" of the invention. Then, a SAL (Soft Adjacent Layer) film 6a, a tantalum (Ta) film 6b and an AMR film 6c are formed on the bottom shield gap film 5 by, for example, sputtering.

The SAL film 6a is a magnetic film for applying lateral bias magnetic field. Specifically, a soft magnetic film such as nickel-ferrous-chrome alloy (NiFeCr) or cobalt-niobium alloy (CoNb) is used for the SAL film 6a. The tantalum film 6b works as a magnetic isolation film. The AMR film 6c is a magnetoresistive film and is formed of a high saturation magnetic material such as permalloy.

Next, a photoresist pattern 7 is formed on the AMR film 6c. At this time, the photoresist pattern 7 with a T-shaped cross section having, for example, a longitudinal bar 7a (height A) and a lateral bar 7b is formed so that lift-off can be easily performed. Then, a pattern of an AMR element 6 is formed to have a taper through etching the AMR film 6c, the tantalum film 6b and the SAL film 6a by ion beam etching such as ion milling method using, for example, Ar (argon) gas using the photoresist pattern 7 as a mask. By forming the taper on the AMR element 6 as described, the contact resistance between the AMR element 6 and the lead electrode layers 8 to be described later is improved. At this time, the AMR element 6 corresponds to a specific example of a "magnetoresistive element" of the invention.

Then, a pair of lead electrode layers 8 which are electrically connected to the AMR element 6 are formed in a thickness of 100 to 200 nm on both sides of the AMR element 6 on the bottom shield gap film 5 by sputtering using the same photoresist pattern 7. The lead electrode layers 8 are formed to be in contact with the area from the bottom shield gap film 5 to the side-end face of the AMR element 6. The lead electrode layers 8 have a configuration in which a domain control film for suppressing noise made of, for example, cobalt-platinum alloy (CoPt) and a lead film for detecting signals made of, for example, titanium-tungsten alloy (TiW) or tantalum are stacked.

After forming the lead electrode layers 8, the photoresist pattern 7 is lifted off. Thereby, the unwanted part of the lead electrode layers 8 on the photoresist pattern 7 is also removed along with the photoresist pattern 7. 37.

In the above-description, after forming the MR element 6 by etching, the lead electrode layers 8 are formed using the photoresist pattern 7 as a mask without exfoliating the photoresist pattern 7. However, the lead electrode layers 8 may be formed as follows: the AMR element 6 is formed by etching; exfoliate the photoresist pattern 7; a photoresist pattern for forming a reading track is formed again; and the lead electrode layers 8 are formed using the photoresist pattern as a mask.

Next, as shown in FIG. 4, a top shield gap film 9 as an insulating layer is formed through forming an insulating material such as aluminum nitride or alumina in a thickness of about 50 to 100 nm on the AMR element 6 and the lead electrode layers 8 by sputtering, and the AMR element 6 is buried in the shield gap films 5 and 9. Then, a top shield-cum-bottom pole (referred as a top pole layer in the followings) 10 made of a magnetic material used for both a reproducing head and a recording head is formed on the top shield gap film 9. The top shield layer 10 may be formed using permalloy, ferrous nitride (FeN), the combination of both, or a high saturation magnetic flux density material such as amorphous Fe—Co—Zr. It may also be formed using a material in which permalloy and a high saturation magnetic flux density material are stacked.

Then, although not shown in figure, an inductive-type magnetic transducer composed of a write gap layer, a thin film coil and a top pole is formed on the top shield layer 10. Thereby, a composite thin film magnetic head with an AMR is completed.

In the embodiment, the concave portion 3a corresponding to the reading track width W is formed on the bottom shield layer 3, and a step $\alpha_1$ (See. FIG. 2) is formed between the region where the AMR element 6 is to be formed and the region where the lead electrode layers 8 are to be formed. As a result, the lead electrode layers 8 can be formed thicker and the wiring resistance can be decreased. At the same time, the step of the top shield gap film 9 on the top shield layer 10 side can be suppressed to a small step even if the lead electrode layers 8 are formed thick. Also, the height A (See. FIG. 3) of the longitudinal bar 7a of the photoresist pattern 7 used for lift-off can be decreased so that the reading track width W can be narrowed and the track density is improved.

According to the embodiment, the step of the top shield layer 10 can be decreased so that the width facing the reading track width W of the top shield layer 10 becomes longer and the side width $\beta$ of the reading track can be decreased. As a result, a thin film magnetic head with less noise can be implemented.

Second Embodiment

A second embodiment of the invention will be described with reference to FIG. 5 to FIG. 9. Part of the configuration identical to that of the first embodiment will be described by adopting the identical numerals.

Figure 5:
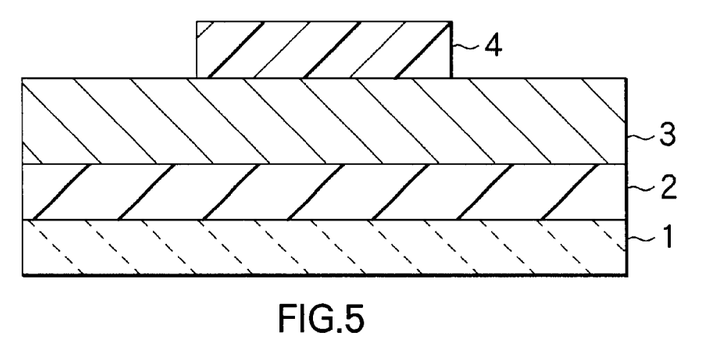
FIG. 5 is a cross section for describing a step in a method of manufacturing a thin film magnetic head according to a second embodiment of the invention.

In the embodiment, first, as shown in FIG. 5, an insulating layer 2 made of, for example, alumina is deposited in a thickness of about 5 to 10 μm on a substrate 1 made of, for example, altic. Then, although not shown in figure, a seed layer as an electrode film which used at the time of forming a bottom shield layer by plating method is formed on the insulating layer 2 by sputtering permalloy. Then, a bottom shield layer 3 for a reproducing head is formed through selectively forming a magnetic material such as permalloy in a thickness of about 2 to 3 μm on the seed layer by plating method using a photoresist film as a mask. Then, a photoresist pattern 4 is formed on the bottom shield layer 3. The steps described heretofore are identical to those of the first embodiment.

Figure 6:
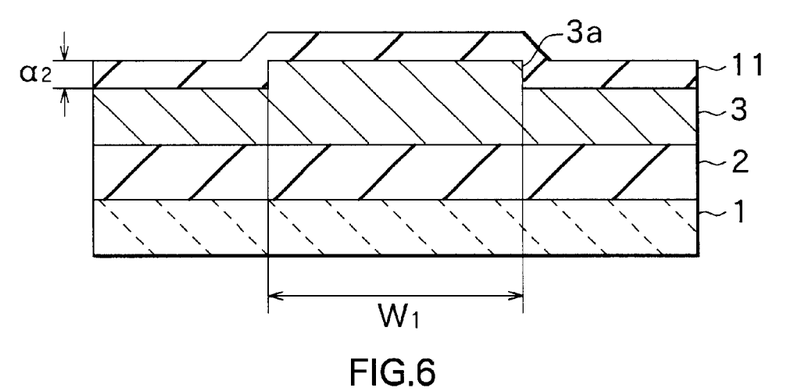
FIG. 6 is a cross section for describing a step following the step shown in FIG. 5.

Next, as shown in FIG. 6, a convex portion 3a having a width $W_1$=0.3 to 3.0 μm, which corresponds to the reading track width, and a height $\alpha_2$=0.1 to 0.5 μm, is selectively formed in the surface of the bottom shield layer 3 by dry etching such as ion beam etching using the photoresist pattern 4 as a mask. Then, the photoresist pattern 4 is removed. Then an insulating layer 11 made of, for example, alumina is formed in a thickness of about 1 μm all over the bottom shield layer 3 where the convex portion 3a is formed.

Figure 7:
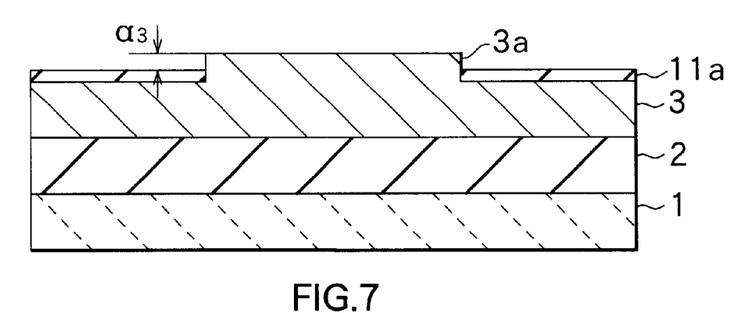
FIG. 7 is a cross section for describing a step following the step shown in FIG. 6.

Next, the insulating layer 11 is polished until the surface of the convex portion 3a of the bottom shield layer 3 by, for example, CMP (Chemical and Mechanical Polishing) to perform flattening processing. Thereby, as shown in FIG. 7, portion of the insulating layer 11 on the convex portion 3a of the bottom shield layer 3 is removed, and the insulating layer 11 is remained to be an insulating layer 11a which is portion of the insulating layer 11 other than the portion on the convex portion 3a. At this time, a step $\alpha_3 (<\alpha_2)$ is formed between the surface of the convex portion 3a and the surface of the insulating layer 11a due to the difference in their etching rate. The flattening process may be performed by mechanical polishing method instead of CMP. The insulating layer 11a corresponds to specific example of "another insulating layer" of the invention.

Figure 8:
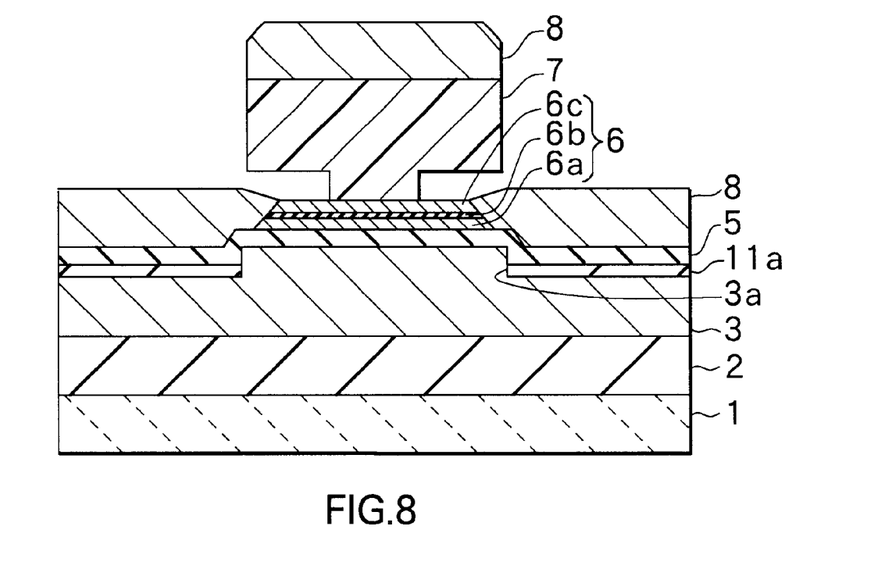
FIG. 8 is a cross section for describing a step following the step shown in FIG. 7.

Next, as shown in FIG. 8, a bottom shield gap film 5 made of such as aluminum nitride or alumina is formed on the insulating layer 11 and the convex portion 3a of the bottom shield layer 3 by sputtering. Then, a SAL film 6a, a tantalum (Ta) film 6b and an AMR film 6c are formed on the bottom shield gap film 5 in the same manner as the first embodiment. Then, a T-shaped photoresist pattern 7 is formed on the AMR film 6c. A pattern of an AMR element 6 is formed through etching the AMR film 6c, the tantalum film 6b and the SAL film 6a by ion milling method using, for example, argon gas using the photoresist pattern 7 as a mask.

Then, a pair of lead electrode layers 8 which are electrically connected to the AMR element 6 are formed on both sides of the AMR element 6 on the bottom shield gap film 5 by sputtering using the same photoresist pattern 7. After forming the lead electrode layers 8, the photoresist pattern 7 is lifted off.

Figure 9:
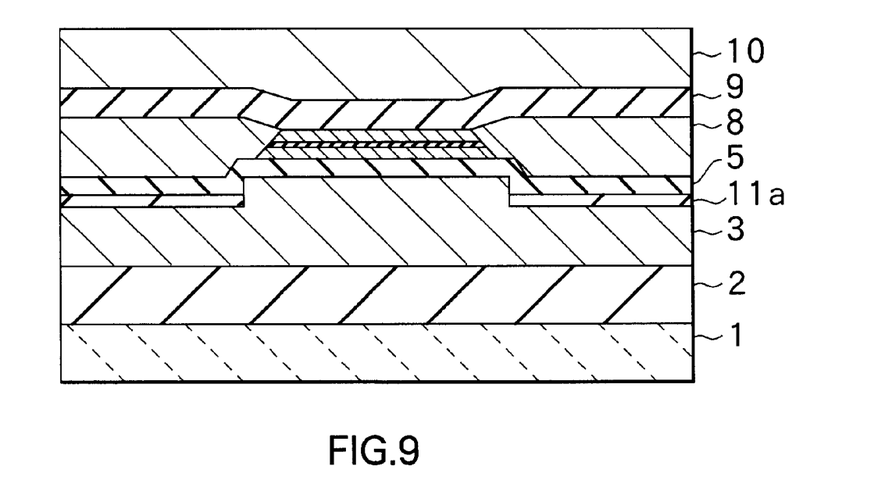
FIG. 9 is a cross section for describing a step following the step shown in FIG. 8.

Next, as shown in FIG. 9, a top shield gap film 9 as an insulating layer is formed on the AMR element 6 and the lead electrode layers 8 by, for example, sputtering, and the AMR element 6 is buried in the shield gap films 5 and 9. Then, a top shield layer 10 is formed on the top shield gap film 9. Then, although not shown in figure, an inductive-type magnetic transducer composed of a write gap layer, a thin film coil and a top pole is formed on the top shield layer 10. Thereby, a composite thin film magnetic head of the embodiment is completed.

In the embodiment, a step $\alpha_3$ is formed between the surface of the insulating layer 11a and the surface of the convex portion 3a. At this time, the insulating layer 11a lies between the lead electrode layers 8 and the bottom shield layer 3 in addition to the insulating layer (bottom shield gap film) 5. As a result, the insulating characteristic between the lead electrode layers 8 and the bottom shield layer 3 can be improved without thickening the insulating layer 5. Therefore, deterioration of magnetic and electrical insulation between the lead electrode layers 8 and the bottom shield layer 3 resulted from particles or pin holes in the film or the like can be suppressed.

Other effects are identical to those of the first embodiment so that the description will be omitted.

Third Embodiment

A third embodiment of the invention will be described with reference to FIG. 8 to FIG. 11. The embodiment relates to a method of manufacturing a composite thin film magnetic head with an AMR and the magnetic head is identical to that of the second embodiment. The configuration identical to that of the first and the second embodiment will be described by adopting the identical numerals.

Figure 10:
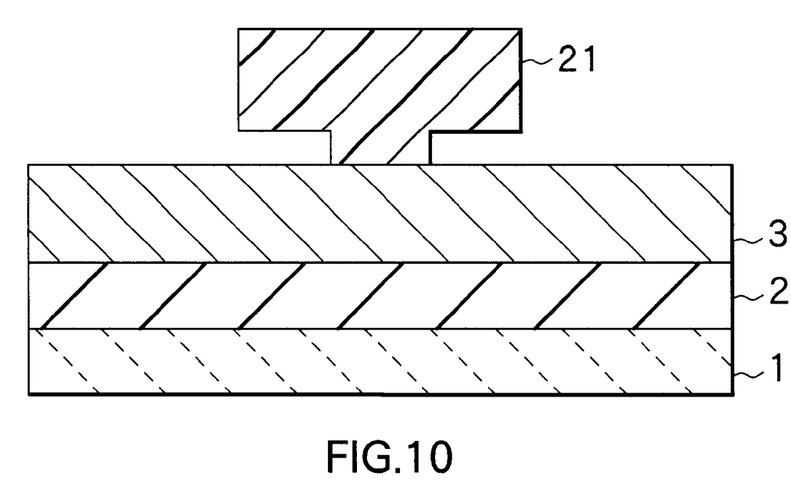
FIG. 10 is a cross section for describing a step in a method of manufacturing a thin film magnetic head according to a third embodiment of the invention.

In the embodiment, first, as shown in FIG. 10, an insulating layer 2, a seed layer (not shown) and a bottom shield layer 3 are formed on a substrate 1 in the same manner as, for example, the second embodiment. Next, a photoresist pattern 21 with, for example, a T-shaped cross section is formed on the bottom shield layer 3.

Figure 11:
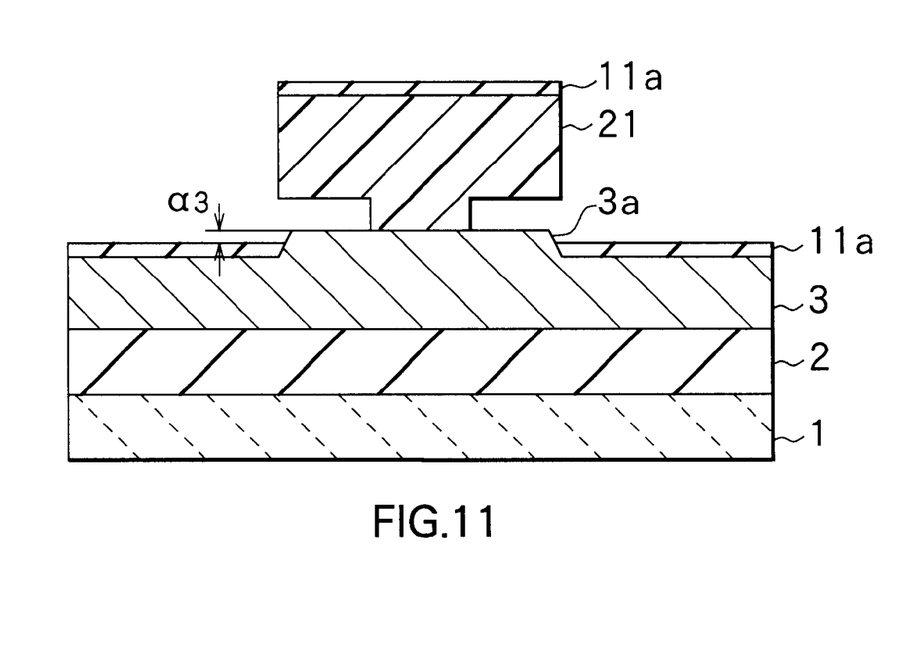
FIG. 11 is a cross section for describing a step following the step shown in FIG. 10.

Next, as shown in FIG. 11, a convex portion 3a is selectively formed in the surface of the bottom shield layer 3 by performing dry etching (for example, ion beam etching) using the photoresist pattern 21 as a mask. Then, an insulating layer 11a of 0.02 to 0.1 μm in thickness made of alumina is formed by, for example, sputtering using the photoresist pattern 21 as a mask. At this time, there is, for example, a step $\alpha_3$ between the surface of the insulating layer 11a and the surface of the concave portion 3a. Then the unwanted part of the insulating layer 11a on the photoresist pattern 21 is also removed along with the photoresist pattern 7 by lifting off the photoresist pattern 21. The steps hereafter is identical to the steps of the second embodiment shown in FIG. 8 and FIG. 9.

In the embodiment, one photoresist pattern 21 is used for forming patterns of the bottom shield layer 3 and the insulating layer 11a. Therefore, the manufacturing process can be decreased compared to the second embodiment, and a thin film magnetic head can be formed practically and less costly.

The invention has been described by referring to the above-mentioned embodiments. However, it is not limited to the above-mentioned embodiments but various modification is possible. For example, a magnetic head with HM (Hard Magnetic Film Bias) method in which an MR portion is formed only in the track is described in the above-mentioned embodiment. However, the invention can be applied to a magnetic head with BCS (Boundary Control Stabilizer) method in which milling is performed on the MR film to some degree during the milling step mentioned above, and then a domain control film is formed.

Also, in the embodiment, a thin film magnetic head using an AMR element as a magnetoresistive element is described. However, it is needless to say that the invention can be applied to a thin film magnetic head using a GMR element.

As described, in a thin film magnetic head and a method of manufacturing the same according to an aspect of the invention, a concave portion corresponding to the reading track width is formed on one of shield layers (or a bottom shield layer). As a result, a step on the other shield layer (a top shield layer) side can be suppressed to a small size even if the lead electrode layer is formed thick. Accordingly, noise can be suppressed. At the same time, a photoresist pattern for lift-off can be minutely formed and the reading track width can be narrowed. Also, the lead electrode layer can be formed sufficiently thick so that the wiring resistance can be decreased. As a result, the track density can be improved.

Furthermore, in a thin film magnetic head and a method of manufacturing the same according to another aspect of the invention, a concave portion corresponding to the reading track width is provided on the bottom shield layer. In the mean time, an insulating layer other than the insulating layer placed between a magnetoresistive element and one of the shield layers, is formed on the surface of the bottom shield layer on the side where the convex portion has been formed. As a result, the insulating characteristic between the lead electrode layer and the bottom shield layer can be improved.

Moreover, a thin film magnetic head and a method of manufacturing the same according to another aspect of the invention, have the steps of forming a convex portion on the bottom shield layer as follows: a convex portion is formed using a mask; an insulating material is deposited on the mask and the bottom shield layer; and the mask and the insulating material are removed. Thereby, the bottom shield layer and a pattern of another insulating layer can be formed using one mask. As a result, the manufacturing process can be decreased and a thin film magnetic head can be formed practically and less costly.

Obviously many modifications and variations of the present invention are possible in the light of the above teachings. It is therefore to be understood that within the scope of the appended claims the invention may be practiced otherwise than as specifically described.

What is claimed is:

1. A thin film magnetic head comprising: a magnetoresistive element; two shield layers placed to face each other sandwiching the magnetoresistive element in between to shield the magnetoresistive element; an insulating layer provided between the magnetoresistive element and each of the shield layers; and a lead electrode layer, which is electrically connected to the magnetoresistive element, provided on one side of a substrate; wherein:

a convex portion corresponding to the reading track width of the magnetoresistive element is provided on one of the shield layers; and further wherein another insulating layer other than the insulating layer provided between the shield layers and the magnetoresistive element is formed on the surface of one of the shield layers on the side where the convex portion is formed and a step is provided between the surface of the convex portion of the shield layer and the surface of the other insulating layer.

2. A thin film magnetic head according to claim 1 wherein the one of the shield layers is a bottom shield layer provided on the substrate side among the two shield layers.

3. A thin film magnetic head according to claim 2 wherein a sidewall surface of the convex portion of the bottom shield layer forms a slope toward the surface of the bottom shield layer on the side where the convex portion is formed.

* * * * *